(No Model.)
J. McD. BOYD.
BRAKE FOR VELOCIPEDES.
No. 452,593. Patented May 19, 1891.
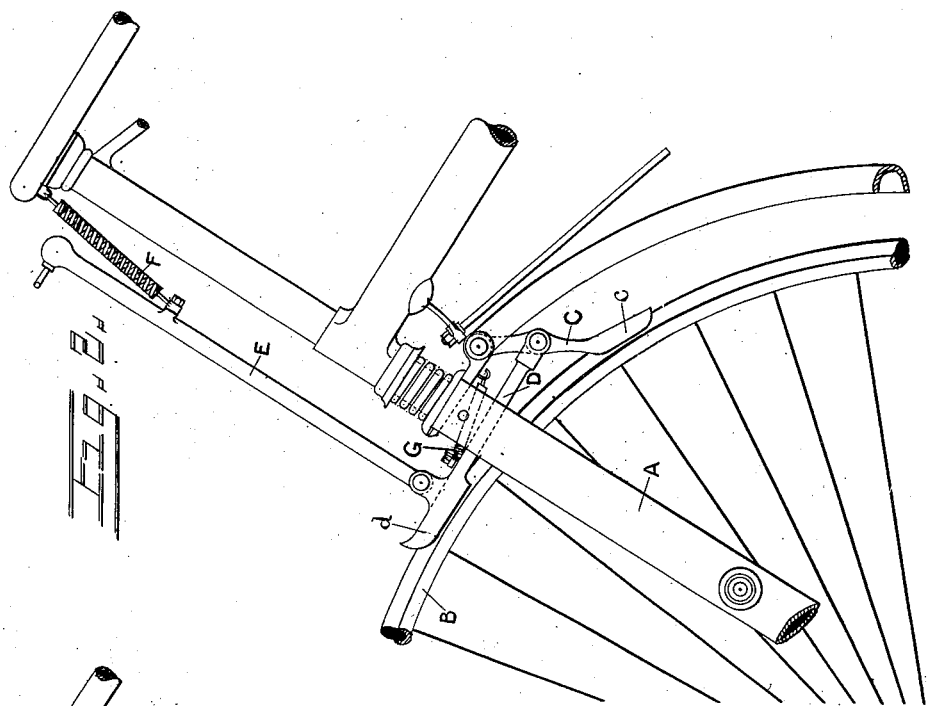
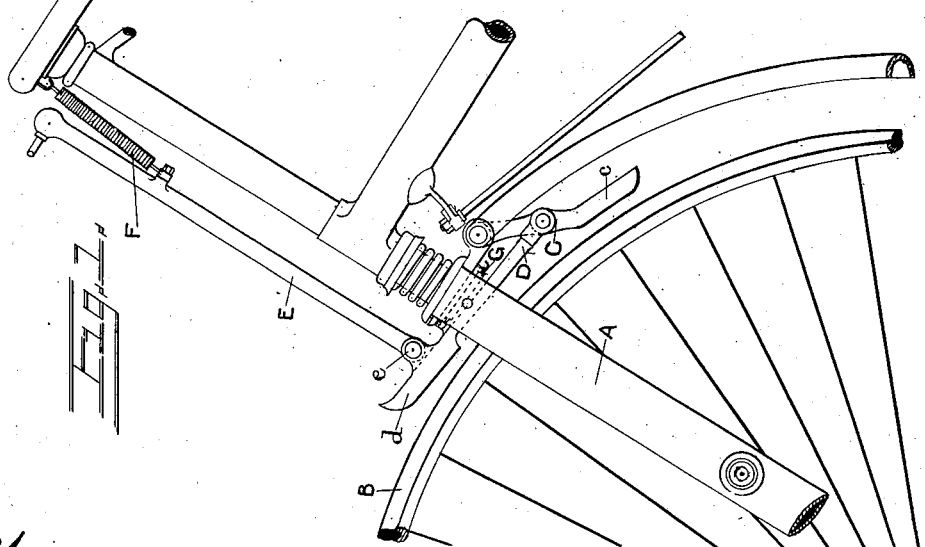

UNITED STATES PATENT OFFICE.

JAMES McDONALD BOYD, OF GALASHIELS, SCOTLAND, ASSIGNOR TO THE OVERMAN WHEEL COMPANY, OF CHICOPEE FALLS, MASSACHUSETTS.

BRAKE FOR VELOCIPEDES.

SPECIFICATION forming part of Letters Patent No. 452,593, dated May 19, 1891.

Application filed February 9, 1891. Serial No. 380,775. (No model.) Patented in England January 23, 1889, No. 1,231.

*To all whom it may concern:*

Be it known that I, JAMES McDONALD BOYD, a subject of the Queen of Great Britain, residing at Galashiels, in the county of Selkirk, Scotland, have invented certain new and useful Improvements in Brakes for Velocipedes and other Road Vehicles, (for which I have obtained Letters Patent in Great Britain, dated 23d day of January, 1889, and numbered 1,231,) of which the following is a full, clear, and exact description of the same.

My invention relates to an improved brake for bicycles, tricycles, and other velocipedes, and it is also applicable to the wheels of other road vehicles; and it has for its object increased brake-power.

My invention as applied to cycles consists in fulcrating the spoon-brake to the center of a lever fulcrated to the fork carrying the wheel and having a brake-spoon formed on its other end. Consequently when the front spoon-brake is applied to the wheel it draws on the back brake, so that no extra force is required from the brake-lever, thus doing away with all extra strain on the hand.

In carrying my invention into practical effect I proceed in the manner shown in the accompanying drawings, in which—

Figure 1 is a broken view, in side elevation, of the front wheel of a cycle having my improved brake attached, the brake being "off;" and Fig. 2 is a similar broken view with the brake "on."

Immediately behind the fork A, carrying the wheel B, is fulcrated a suitably-shaped lever C, having its rear and free end *c* formed as a spoon shaped to adapt it to bear upon the tire of the wheel to which the brake is to be applied. To the center, or approximately so, of the lever C is fulcrated the lever D of the front brake, which is also formed with a spoon *d* at its free end. To the lever D is connected by suitable means, preferably by a pin or its equivalent *e*, the lower end of a rod or link E, connecting the said lever with the operating hand-lever on the handle-bar, and it is provided with a suitable spring F for the purpose of withdrawing and holding the front brake D off the wheel. Another spring G is so mounted as to withdraw and hold the back brake-lever C off the wheel in unison with the front brake D. The action of this combined brake is such that on the operating hand-lever being moved it presses down the rod or link E, thus causing the brake-lever D to be not only pressed downward, but simultaneously drawn horizontally forward, so that the moment the brake-lever D commences to act on the tire of the wheel its horizontal movement brings the brake-lever C into operation upon the tire of the wheel, so that by one action of the operating-handle the two brakes C and D are at once brought to bear upon the tire of the wheel, as shown in Fig. 2, instead of one, as hitherto, thus providing a very effective brake giving more than double the effect with the same amount of applied power.

I am aware that at the date of my invention it was not new to combine a spoon-brake acting on the periphery of a wheel with a band-brake acting on the hub or axle thereof, and I therefore lay no claim to such; but, Having now particularly described and ascertained the nature of my said invention and in what manner the same is to be performed, I declare that what I claim, and desire to secure by Letters Patent, is—

1. In a velocipede, the combination, with two brake-levers connected together, of an operating-lever connected with the forward brake-lever, substantially as described, and whereby the dragging action of the wheel on the forward lever draws the rear lever toward the wheel and into action.

2. In a brake for velocipedes and other road vehicles, the combination of the brake-levers C and D, the operating rod or link E, and the springs F and G, all combined, arranged, and operating as and for the purpose set forth.

3. In a velocipede or other road vehicle, the combination of the lever C, fulcrated to the rear of the fork carrying the wheel to be braked and having a spoon *e* formed on its rear and free end, of the lever D, fulcrated to the lever C and having a spoon *d* formed at its forward and free end, of the operating rod or link E, of the spring F, adapted to keep the brake-spoon *d* off the wheel, and of the spring G, adapted to keep the brake-spoon *c* off the wheel, all combined, arranged, and operating as and for the purpose set forth.

4. In a velocipede, the combination, with a brake-lever fulcrumed to a part of the vehicle-frame, of a brake-lever fulcrumed to the lever before mentioned between the ends thereof and extending forward therefrom, and an operating-lever connected with the lever last mentioned, substantially as described, and whereby the dragging action of the wheel on the forward brake-lever applies the rear brake-lever.

In witness whereof I have hereunto signed my name in the presence of two subscribing witnesses.

JAMES McDONALD BOYD.

Witnesses:
 WILLIAM THOM,
 HERBERT MANSON.